US012785075B2

(12) United States Patent
Guo et al.

(10) Patent No.: US 12,785,075 B2
(45) Date of Patent: Nov. 3, 2026

(54) NEGATIVE PLATE, SECONDARY BATTERY INCLUDING THE NEGATIVE PLATE, AND AN ELECTRIC DEVICE

(71) Applicant: CALB Group Co., Ltd., Jiangsu (CN)

(72) Inventors: Dexiang Guo, Jiangsu (CN); Chuanzhen Fang, Jiangsu (CN); Taotao Shen, Jiangsu (CN); Zhi Qiao, Jiangsu (CN); Xuyi Shan, Henan (CN)

(73) Assignee: CALB Group Co., Ltd., Jiangsu (CN)

( * ) Notice: Subject to any disclaimer, the term of this patent is extended or adjusted under 35 U.S.C. 154(b) by 572 days.

(21) Appl. No.: 18/506,052

(22) Filed: Nov. 9, 2023

(65) Prior Publication Data

US 2025/0046791 A1 Feb. 6, 2025

(30) Foreign Application Priority Data

Aug. 2, 2023 (CN) ......................... 202310964514.8

(51) Int. Cl.

| | |
|---|---|
| ***H01M 4/36*** | (2006.01) |
| ***H01M 4/133*** | (2010.01) |
| ***H01M 4/134*** | (2010.01) |
| ***H01M 4/48*** | (2010.01) |
| ***H01M 4/587*** | (2010.01) |
| ***H01M 4/62*** | (2006.01) |
| *H01M 4/02* | (2006.01) |

(52) U.S. Cl.

CPC ........... *H01M 4/364* (2013.01); *H01M 4/133* (2013.01); *H01M 4/134* (2013.01); *H01M 4/366* (2013.01); *H01M 4/48* (2013.01); *H01M 4/587* (2013.01); *H01M 4/62* (2013.01); *H01M 4/626* (2013.01); *H01M 2004/027* (2013.01)

(58) Field of Classification Search

CPC ...... H01M 4/364; H01M 4/133; H01M 4/134; H01M 4/366; H01M 4/48; H01M 4/587; H01M 4/62; H01M 4/626; H01M 2004/027; H01M 4/38; H01M 4/386; H01M 4/483; H01M 4/485; H01M 4/622; H01M 4/625; H01M 4/661; H01M 10/052; H01M 10/0525; H01M 10/0569; H01M 4/13; Y02E 60/10

See application file for complete search history.

(56) References Cited

U.S. PATENT DOCUMENTS

| | | | | |
|---|---|---|---|---|
| 2014/0162131 | A1* | 6/2014 | Friend | H01M 4/386 429/232 |
| 2024/0120494 | A1* | 4/2024 | Brambilla | H01M 4/625 |
| 2024/0297337 | A1* | 9/2024 | Mcconohy | H01M 4/505 |
| 2024/0405198 | A1* | 12/2024 | Sanchez | H01M 4/134 |
| 2024/0413303 | A1* | 12/2024 | Sanchez | H01M 4/134 |

* cited by examiner

*Primary Examiner* — Muhammad S Siddiquee
(74) *Attorney, Agent, or Firm* — JCIP GLOBAL INC.

(57) ABSTRACT

The present invention discloses a negative plate, a secondary battery including the negative plate, and an electric device. The negative plate of the present invention comprises a negative current collector and an anode active material layer. The anode active material layer comprising an anode active material. The negative plate satisfies the following relationship: $-1.75 \leq \lg(W_{Al} \times W_S/\alpha) \leq 1.05$, $0.2 \leq \lg(W_S \times R) + 0.15 \times R \leq 2.5$, where $W_{Al}$ and $W_S$ are mass fractions of aluminum and sulfur respectively; α is a contact angle of the anode active material layer with a mixed solvent of ethylene carbonate and methyl ethyl carbonate; and R is an ion transport impedance of the negative plate. When the negative plate of the present invention is applied to the secondary battery, cracking of the negative plate during charging and discharging can be significantly reduced, thereby improving the cycle performance of the battery and also improving the capacity retention rate of the battery during low-temperature cycling.

12 Claims, 1 Drawing Sheet

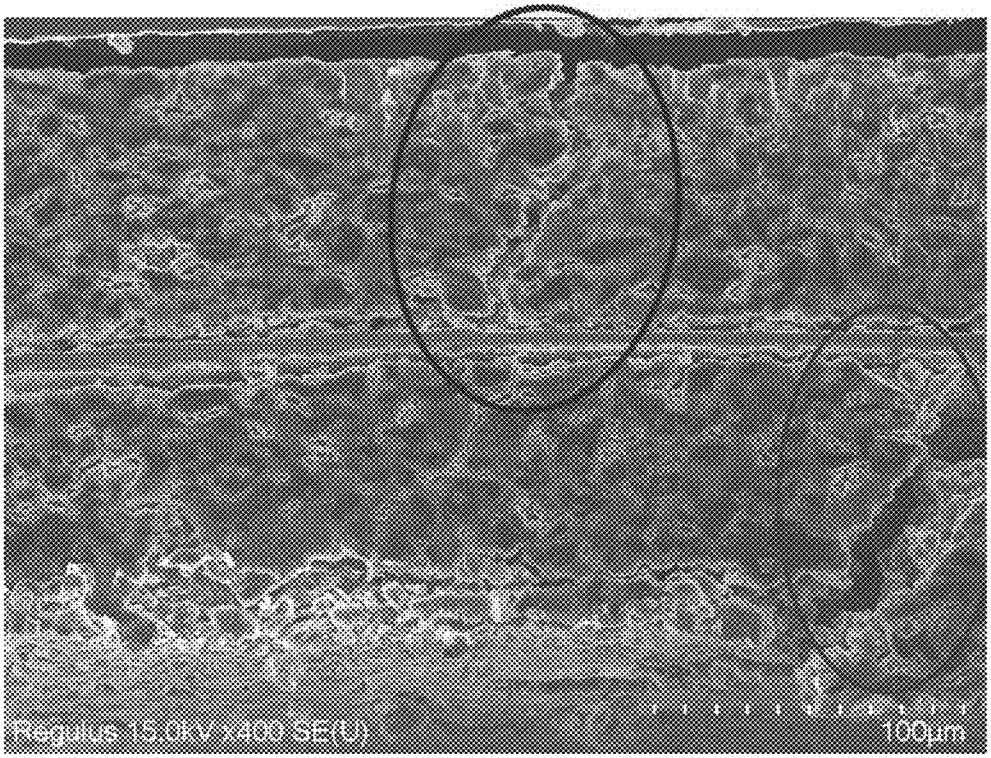
Regulus 15.0kV x400 SE(U)
100μm

NEGATIVE PLATE, SECONDARY BATTERY INCLUDING THE NEGATIVE PLATE, AND AN ELECTRIC DEVICE

CROSS-REFERENCE TO RELATED APPLICATION

This application claims the priority benefit of Chinese application serial no. 202310964514.8, filed on Aug. 2, 2023. The entirety of the above-mentioned patent application is hereby incorporated by reference herein and made a part of this specification.

TECHNICAL FIELD

The present invention relates to the technical field of batteries, and more particularly, to a negative plate, a secondary battery including the negative plate, and an electric device.

BACKGROUND ART

With the popularization and development of electric vehicles, batteries, being the core component of electric vehicles, is receiving extensive attention because of the improvement of its energy density as the main way to solve the "mileage anxiety".

The low theoretical lithium storage capacity of current carbonaceous anode materials seriously restricts the further improvement of energy density of lithium ion batteries. Silicon has ten times the theoretical specific capacity of carbon. Therefore, silicon-based anodes have come into the field of view to accommodate higher energy density battery requirements.

Among numerous silicon and its compounds, silicon oxides have a relatively higher theoretical capacity and are good materials for lithium ion battery anodes. However, the conductivity of silicon oxide is poor. When the silicon oxide is used as a negative electrode material, the expansion and contraction during lithium intercalation and delithiation are very large, which results in the damage of silicon oxide during charge and discharge and easily causes the problem of volume expansion. This results in the crack of lithium ion battery anode during cycling, poor cycling performance and low capacity retention at low temperature, which restricts the large-scale use of lithium ion battery anodes.

SUMMARY OF THE INVENTION

The present invention provides a negative plate, a secondary battery including the negative plate, and an electric device. An anode active material of the negative plate comprises a carbon material and a silicon oxide, and further comprises a certain amount of an aluminum element and a sulfur element. The negative plate can be applied to the secondary battery to significantly reduce the cracking of the negative plate during charging and discharging, thereby improving the cycle performance of a lithium ion battery, and also improving the capacity retention rate of the battery during low-temperature cycling.

In a first aspect of the present invention, the present invention provides a negative plate comprising a negative current collector and an anode active material layer provided on at least one surface of the negative current collector, the anode active material layer comprising an anode active material, The anode active material comprises a carbon material and a silicon oxide; the anode active material further comprises an aluminum element and a sulfur element; wherein the negative plate satisfies the relationships described in Formula (1) and Formula (2):

$$-2 \le lg(W_{Al} \times W_S/\alpha) \le 1.05, \quad \text{Formula (1)},$$

$$0.2 \le lg(W_S \times R) + 0.15 \times R \le 2.5, \quad \text{Formula (2)};$$

- $W_{Al}$ and $W_S$ are mass fractions of aluminum and sulfur in the anode active material, respectively, in the unit of ppm;
- α is a contact angle, in degrees (°), of the anode active material layer with a solvent, where the solvent is a mixed solution of ethylene carbonate and methyl ethyl carbonate in a weight ratio of 1:1;
- R is an ion transport impedance of the negative plate, in the unit of ohms (Ω).

As a preferred embodiment of the present invention, the negative plate satisfies the relationship described by Formula (3):

$$0.4 \le lg(W_{Al} \times W_S/\alpha) \le 0.95, \quad \text{Formula (3)}.$$

As a preferred embodiment of the present invention, the negative plate satisfies the relationship described by Formula (4):

$$1.25 \le lg(W_S \times R) + 0.15 \times R \le 2.0, \quad \text{Formula (4)}.$$

As a preferred embodiment of the present invention, the $W_{Al}$ ranges from 0.5 ppm to 12 ppm; and/or the $W_S$ ranges from 1.0 ppm to 22 ppm.

As a more preferred embodiment of the present invention, the $W_{Al}$ ranges from 5.0 ppm to 10.6 ppm; and/or the $W_S$ ranges from 4.5 ppm to 21.5 ppm.

As a preferred embodiment of the present invention, the α ranges from 200 to 50°.

As a more preferred embodiment of the present invention, the α ranges from 22° to 35°.

As a preferred embodiment of the present invention, the R ranges from 0.05Ω to 3Ω.

As a more preferred embodiment of the present invention, the R ranges from 0.2Ω to 2Ω.

As a preferred embodiment of the present invention, the silicon oxide is present in a weight ratio of 1 wt. % to 10 wt. % based on the total weight of the carbon material and the silicon oxide.

In a second aspect of the present invention, the present invention provides a secondary battery comprising a positive plate, a negative plate which is the above-mentioned negative plate, and an electrolyte.

In a third aspect, the present invention provides an electric device comprising the secondary battery.

BRIEF DESCRIPTION OF THE DRAWINGS

The figure is a scanning electron micrograph of a negative plate of Comparative Example 1 of the present invention after cycling at 45° C. for 200 cycles.

DETAILED DESCRIPTION OF THE EMBODIMENTS

In order to make the objectives, technical solutions, and advantages of embodiments of the invention clearer, the technical solutions in the embodiments of the invention will be described clearly and completely below. Obviously, the described embodiments are part of the invention, rather than all of the embodiments. Based on the embodiments in the invention, all other embodiments obtained by a person skilled in the art without involving any inventive effort are within the scope of protection of the invention.

In the present invention, among the technical features which are described in an open manner, it includes a closed technical solution consisting of the recited features as well as an open technical solution containing the recited features.

In the present invention, reference is made to numerical ranges which are, unless otherwise indicated, to be considered continuous and to include both the minimum and maximum values of the range, and every value between the minimum and maximum values. Further, when a range refers to an integer, every integer between the minimum and maximum values of the range is included. Further, when multiple ranges are provided to describe a feature or characteristic, the ranges can be combined. In other words, unless otherwise indicated, all ranges disclosed herein are to be understood to include any and all subranges subsumed therein.

In the present invention, the specific dispersion and stirring treatment methods are not particularly limited.

Where the reagents or instruments used in the invention are not specified by the manufacturer, they are conventional products commercially available.

In order to solve the problems of the lithium ion battery anode material in the prior art, such as cracks during cycling, poor cycling performance, and low capacity retention rates at a low temperature, the embodiments of the present invention provide a negative plate including a negative current collector and an anode active material layer provided on at least one surface of the negative current collector, the anode active material layer including an anode active material.

The anode active material includes a carbon material and a silicon oxide; the anode active material further comprises an aluminum element and a sulfur element; wherein the negative plate satisfies the relationships described in Formula (1) and Formula (2):

$$-2 \leq lg(W_{Al} \times W_S/\alpha) \leq 1.05, \quad \text{Formula (1),}$$

$$0.2 \leq lg(W_S \times R) + 0.15 \times R \leq 2.5, \quad \text{Formula (2);}$$

$W_{Al}$ and $W_S$ are mass fractions of aluminum and sulfur in the anode active material, respectively, in the unit of ppm;

- α is a contact angle, in degrees (°), of the anode active material layer with a solvent, where the solvent is a mixed solution of ethylene carbonate and methyl ethyl carbonate in a weight ratio of 1:1;
- R is an ion transport impedance of the negative plate, in the unit of ohms (Ω).

The anode active material in the negative plate according to the present invention comprises a carbon material and a silicon oxide, and also comprises a certain amount of Al and S. When the negative plate of the present invention is applied to the secondary battery, cracking of the negative plate during charging and discharging can be significantly reduced, thereby improving the cycle performance of the battery and also improving the capacity retention rate of the battery during low-temperature cycling.

In the present invention, by comprehensively controlling the contact angle between the contents of aluminum and sulfur in the anode active material and the anode active material layer, and the ion transport impedance of the negative plate, the cracking of the negative plate obtained during charge and discharge is significantly improved. When the negative plate is applied to a secondary battery, the cycle performance of the battery, especially the capacity retention at a low temperature, is also improved.

For the anode active material of the present invention, a certain amount of Al, S contributes to the improvement of the cycle performance. The anode active material containing silicon oxide contains a certain amount of Al. The number of electrons in the outer layer of Al is less than that in the outer layer of silicon, so that electron vacancies are formed, and the generation of vacancies may improve the electrical conductivity of silicon material. As the electrical conductivity of silicon oxide is an important factor restricting the cycling thereof, a certain amount of Al may improve the cycle performance of the material to a certain extent. The lithium sulfide formed by the reaction of S in the anode active material with lithium ions may play a buffering role in the interior of the particles, thereby improving the crack condition and cycle performance of the negative plate.

With regard to Al and S, on the one hand, it is possible to introduce aluminum elements due to the preparation of the anode active material, such as the addition of alumina when preparing the silicon-oxygen material precursor. On the other hand, it can be introduced by separately adding the corresponding elements in the preparation of the anode active material.

The contact angle is the included angle of the liquid-solid-gas three phases. The contact angle in the present invention is the contact angle of the anode active material layer with a mixed solvent of the ethylene carbonate and ethyl methyl carbonate. The electrolyte of a lithium ion battery generally includes a lithium salt, a solvent, and an additive. Ethylene carbonate and methyl ethyl carbonate used in the contact angle test of the present invention are solvents commonly used in the electrolyte. When the contact angle decreases, the wetting rate of electrolyte to the plate increases, the electrolyte wets the plate more easily. The distribution uniformity of electrolyte in the whole structure of the cell is also higher. The increase of wetting rate may not only improve the liquid-phase transport rate of lithium ions and the low-temperature capacity retention rate of the battery, but also ensure that the plate may fully absorb the electrolyte, which improves the increase of polarization and lithium precipitation caused by insufficient liquid absorption at the later stage of the cycle, and thus improves the cycle life. In addition, when the contact angle is excessively small, the compacted density of the negative plate may be low, resulting in insufficient energy density of the battery.

Considering that the contact angle and $W_{Al}$ and $W_S$ all have an effect on the cycle performance and swelling of the battery, in the present invention, combining the contact angle and the contents of Al and S to control the range in which $W_{Al}$, $W_S$ and α satisfy the Formula (1) may significantly improve the crack condition and cycle performance of the negative plate.

The ion transport impedance reflects the rate at which electrolyte ions are transported in the electrode channels. Generally speaking, when the ion transport impedance is low, the transport rate of electrolyte ions is relatively high, contributing to higher capacity retention rates of the battery at low temperatures. However, the ion transport impedance should not be too low. The ion transport impedance of the negative plate is affected by various factors, such as the pore structure of the anode active material layer, the porosity, the morphological characteristics of the anode active material, etc. If, in order to achieve a lower ion transport impedance, it is possible to increase the active reaction sites in the negative plate and more active material is used for nesting lithium ions. On one hand, a large amount of active lithium is consumed. On the other hand, expansion and contraction of the plate are caused, so that microcracks occur in the cycle, thereby causing a decrease in the cycle performance of the battery.

The content of sulfur in the anode active material affects the ion transport impedance of the negative plate to some extent. The sulfur element in the anode active material may form sulfide by chemical reaction with lithium ions to provide additional reaction sites and increase the adsorption and storage capacity of lithium ions. This means that more lithium ions may participate in the reaction and be transported by the anode active material during charge and discharge, thereby reducing the ion transport impedance to some extent. However, as the content of sulfur element increases, excessive accumulation of sulfides or formation of oversized sulfides may be caused, which in turn increases the length of the ion transport path and affects the ion transport impedance.

Therefore, with the negative plate of the present invention, the low-temperature capacity retention rate, the crack condition, and the cycle performance of the battery are simultaneously improved by comprehensively adjusting $W_S$ and R to satisfy the range of Formula (2).

Illustratively, in the present invention, the value of $lg(W_{Al} \times W_S/\alpha)$ may be −1.9, −1.8, −1.7, −1.5, −1.0, −0.5, 0, 0.1, 0.3, 0.5, 0.8, 0.9.

Illustratively, in the present invention, the value of $lg(W_S \times R)+0.15 \times R$ may be 0.2, 0.5, 0.8, 1.0, 1.2, 1.5, 1.7, 1.9, 2.0, 2.3, 2.5.

In one of the embodiments, the negative plate satisfies the relationship described by Formula (3):

$$0.4 \le lg(W_{Al} \times W_S/\alpha) \le 0.95, \quad \text{Formula (3).}$$

In one of the embodiments, the negative plate satisfies the relationship described by Formula (4):

$$1.25 \le lg(W_S \times R) + 0.15 \times R \le 2.0, \quad \text{Formula (4).}$$

When the negative plate also satisfies the relationship described in Formula (3) and/or Formula (4), the negative plate has fewer cracks during charging and discharging, and the battery has a higher capacity retention rate and a higher cycle life during low-temperature cycling.

In an embodiment, the $W_{Al}$ ranges from 0.5 ppm to 12 ppm; and/or the $W_S$ ranges from 1.0 to 22 ppm.

In a more preferred embodiment, the $W_{Al}$ ranges from 5.0 ppm to 10.6 ppm; and/or the $W_S$ ranges from 4.5 ppm to 21.5 ppm.

For example, the $W_{Al}$ may be 0.5 ppm, 1.0 ppm, 1.5 ppm, 2.0 ppm, 3.0 ppm, 5.0 ppm, 8.0 ppm, 10.0 ppm, 11.0 ppm, 12.0 ppm.

For example, the $W_S$ may be 1.0 ppm, 1.5 ppm, 2.0 ppm, 3.0 ppm, 5.0 ppm, 10.0 ppm, 15.0 ppm, 18.0 ppm, 20.0 ppm, 22.0 ppm.

As described above, a certain amount of the aluminum element and the sulfur element contributes to the improvement in the performance of the negative plate. However, the content of the aluminum element and the sulfur element should not be excessively high. The presence of aluminum causes vacancies to be generated, and the reactivity at the vacancies is high. If the number of vacancies is too large, the improvement of the cycle performance of the battery is disadvantageous. In the anode active material, S belongs to an impurity element, which may have a side reaction with the electrolyte to have a negative effect, such as a decrease in the capacity retention rate of the battery at a low temperature. When $W_{Al}$ and $W_S$ are within the above ranges, the overall performance of the negative plate is relatively better.

The method for detecting $W_{Al}$ and $W_S$ is not limited in the present invention. A person skilled in the art would have been able to detect $W_{Al}$ and $W_S$ according to conventional technical means.

By way of example, the following inductively coupled plasma emission spectrometry (ICP-OES) method may be used for determination.

In one of the embodiments, the α ranges from 20° to 50°, e.g., the α is 20°, 22°, 23°, 25°, 28°, 30°, 35°, 40°, 45°, 50°.

In a preferred embodiment, the α ranges from 220 to 35°.

With the negative plate of the present invention, when α is 22° to 35°, the cycle life of the battery using the negative plate and the cracking of the negative plate are good. The capacity retention rate at a low temperature is relatively higher.

With regard to the method for detecting the contact angle, it is not limited by the present invention. A person skilled in the art would have been able to detect the contact angle of the anode active material layer with the mixed solvent of ethylene carbonate and methyl ethyl carbonate according to conventional technical means. By way of example, a contact angle tester may be used for detection.

In one of the embodiments, the R ranges from 0.05Ω to 3Ω, e.g., the R is 0.05Ω, 0.08Ω, 0.10Ω, 0.15Ω, 0.20Ω, 0.50Ω, 1.0Ω, 1.5Ω, 2.0Ω, 2.5Ω, 2.7Ω, 2.80Ω, 2.85Ω, 2.90Ω, 3.0Ω.

In a preferred embodiment, the R ranges from 0.2Ω to 2Ω.

In the present invention, when R ranges from 0.05Ω to 3Ω, particularly in the range of 0.2n to 2Ω, the cycle performance and crack condition of the negative plate are relatively superior.

The ion transport impedance of the negative plate may be measured as follows. Symmetric batteries were prepared by using two identical negative pole pieces. The electrochemical impedance spectroscopy (EIS) of symmetrical batteries is obtained by using an electrochemical workstation. The alternating-current impedance spectra are obtained by the EIS test. EIS test obtained AC impedance spectrum. The impedance composition is analyzed by combining the equivalent circuit diagram and the impedance decomposition model, so as to obtain a Nyquist diagram and a bode diagram. The Z-view or EC-Lab software is used for fitting, and the coincidence degree between the simulation diagram and the measured diagram is improved by adjusting the values of the impedances. The ion transport impedance is calculated according to the following formula: $Z'_{\omega \to 0}=R_{sol}-R_{ion}/3$, where $R_{ion}$ is an ion transport impedance in the present application; and $R_{sol}$ is an ohmic impedance; $Z'_{\omega \to 0}$ is a mixed impedance. The values of $R_{sol}$ and $Z'_{\omega \to 0}$ can be obtained according to the Nyquist diagram of EIS (refer to the detection method in this document: Ogihara N, Kawauchi S, Okuda C, et al. Theoretical and experimental analysis of porous electrodes for lithium-ion batteries by electrochemical impedance spectroscopy using a symmetric cell[J]. Journal of The Electrochemical Society, 2012, 159 (7): A1034.).

In one of the embodiments, the silicon oxide is present in a weight ratio of 1 wt. % to 10 wt. %, for example 1 wt. %, 2 wt. %, 3 wt. %, 5 wt. %, 8 wt. %, 10 wt. %, relative to the total amount of carbon material and silicon oxide.

In one of the embodiments, the carbon material includes at least one of graphite, soft carbon, and hard carbon. Among these, graphite is preferably selected as the carbon material. The graphite refers to a material having a graphite-type crystal structure, including, for example, natural graphite, artificial graphite, mesocarbon microbeads, and the like.

In one of the embodiments, the silicon oxide includes $SiO_x$, where $0<x<2$.

A person skilled in the art would detect the weight ratio of the carbon material and the silicon oxide in the anode active material according to conventional technical means. For example, the weight of the carbon material contained in the anode active material may be measured by a combustion method. The ratio of silicon may be determined by ICP optical emission spectroscopy and ICP mass spectrometry, and the binding state of silicon and oxygen (namely, the value of x in SiOx) is checked by the X-ray photoelectron spectroscopy (XPS or ESCA) so as to determine the composition and weight of the silicon oxide. The weight proportion of silicon oxide relative to the total amount of the carbon material and the silicon oxide may be calculated from the weight of the carbon material and the silicon oxide.

The method for preparing the anode active material is not particularly limited in the present invention, and a person skilled in the art may prepare the anode active material by conventional means.

Illustratively, the negative plate is prepared by:

- mixing a carbon source precursor and a doping element precursor (if any), and performing a reaction at 120° C. to 200° C. for 5 h to 10 h to obtain a modified carbon source precursor;
- graphitizing the obtained modified carbon source precursor under the protection of an inert gas, wherein the graphitizing temperature is 2200° C. to 3000° C., and the time is 2 h to 10 h; after cooling down, pulverizing the mixture to obtain a carbon material containing a doping element;
- mixing silicon, silicon dioxide and a doping element (if any), and ball-milling the mixture, wherein the rotation speed of the ball-milling is 400 rpm to 800 rpm, and the time is 2 h to 10 h; then heating and gasifying the same under vacuum conditions, wherein the temperature of the heating and gasifying is 700° C. to 1200° C., and the time is 1 h to 6 h; after cooling, crushing and classifying the same to obtain an intermediate product ($SiO_x$ containing a doping element); introducing a carbon-containing gas under the protection of an inert gas for vapour deposition, the temperature of the vapour deposition being 700° C. to 1000° C., so as to form a carbon layer coated on the surface of the intermediate product; thereby preparing a silicon oxide material containing a doping element, wherein the inner core is $SiO_x$ containing a doping element, and the outer layer is coated with a carbon layer; and
- mixing a carbon material containing a doping element and a silicon oxide material containing a doping element to obtain an anode active material.

As for the negative plate, the present invention does not particularly limit the negative current collector as long as it has high conductivity without causing adverse chemical changes in the battery. For example, copper, stainless steel, aluminum, nickel, titanium, carbon fired, copper or stainless steel surface-treated with one of carbon, nickel, titanium, silver, or the like, or an aluminum-cadmium alloy may be used.

The anode active material layer of the negative plate may further include a conductive agent and a binder in addition to the anode active material.

The conductive agent functions to improve the conductivity of the anode active material layer. The present invention has no particular limitation on the conductive agent, for example, carbon powder such as carbon black, acetylene black, ketjen black, channel black, furnace black, lamp black or thermal black, graphite powder such as natural graphite or artificial graphite, conductive fiber such as carbon fiber or metal fiber; and conductive whiskers such as zinc oxide whiskers or potassium titanate whiskers.

The binder serves to enhance adhesion between the conductive agent, the anode active material, and the negative current collector. The binder is not particularly limited in the present invention. For example, a polymer material such as a fluororesin-based binder, a rubber-based binder, a cellulose-based binder, a polyol-based binder, a polyolefin-based binder, a polyimide-based binder, a polyester-based binder, a silane-based binder, or the like may be used.

In addition, a thickener, which may use carboxymethyl cellulose, may be further included in the anode active material layer.

It should be noted that the preparation method of the negative plate is not particularly limited in the present invention, and a person skilled in the art would prepare the negative plate according to conventional methods.

Illustratively, the negative plate is prepared by:

- dissolving or dispersing an anode active material and optionally a binder and a conductive agent in a solvent to prepare an anode slurry;
- coating a negative current collector with the anode slurry, and then rolling or drying the same to obtain a negative plate; or,
- casting the anode slurry on a separate support and then laminating the membrane separated from the support on the negative current collector to obtain a negative plate.

Optionally, the sulfur-containing material includes at least one of elemental sulfur, ammonium persulfate, thioacetamide, thiourea, sodium sulfate; the aluminum-containing substance includes at least one of elemental aluminum, aluminum fluoride, aluminum chloride, aluminum nitrate, and aluminum sol.

An embodiment of the present invention provides a secondary battery including a positive plate, a negative plate which is the above-described negative plate, and an electrolyte.

The positive plate of the invention includes a positive current collector and an anode positive active material layer provided on at least one surface of the positive current collector. The anode positive active material including an anode pole active material and may also include conductive agents and/or binders.

The positive current collector is not particularly limited in the present invention as long as it has high conductivity without causing adverse chemical changes in the battery. For example, copper, stainless steel, aluminum, nickel, titanium, carbon fired, copper or stainless steel surface-treated with one of carbon, nickel, titanium, silver, or the like, or an aluminum-cadmium alloy may be used. The positive current collector may be the same as or different from the negative current collector of the present invention.

The cathode active material is a compound capable of reversibly intercalating and deintercalating lithium. For example, the cathode active material may include a lithium composite metal oxide including lithium and at least one metal selected from the group consisting of Mg, Al, Ca, Sc, Ti, V, Cr, Mn, Fe, Co, Ni, Cu, Zn, Ga, Ge, Y, Zr, Sn, Sb, W, Pb and Bi, and preferably at least one selected from the group consisting of Co, Ni, and Mn. Specifically, the cathode active material may include at least one of $Li(Ni_{0.6}Mn_{0.2}Co_{0.2})O_2$, $Li(Ni_{0.7}Mn_{0.2}Co_{0.10})O_2$, $Li(Ni_{0.8}Mn_{0.1}Co_{0.1})O_2$, $Li(Ni_{0.8}Co_{0.15}Al_{0.05})O_2$, $Li(Ni_{0.86}Mn_{0.07}Co_{0.05}Al_{0.02})O_2$, $Li(Ni_{0.9}Mn_{0.05}Co_{0.05})O_2$.

It should be noted that the method for preparing the positive plate is not particularly limited in the present invention, and a person skilled in the art would prepare the positive plate according to conventional methods.

The electrolyte of the present invention may be any electrolyte suitable in the art for use in electrochemical energy storage devices. The electrolyte includes an electrolyte and a solvent. The electrolyte may generally include a lithium salt. More specifically, the lithium salt may be an inorganic lithium salt and/or an organic lithium salt. The solvent in the electrolyte is generally a non-aqueous solvent. Specifically, the solvent includes at least one of ethylene carbonate, propylene carbonate, butylene carbonate, pentylene carbonate, dimethyl carbonate, diethyl carbonate, dipropyl carbonate, methyl ethyl carbonate, or a halogenated derivative thereof.

The secondary battery may further include a separator positioned between the positive plate and the negative plate for spacing the positive plate and the negative plate and preventing the positive plate and the negative plate from contacting and short-circuiting. The separator may be any of a variety of materials known in the art suitable for use as a separator for electrochemical energy storage devices. Specifically, the separator includes at least one of polyethylene, polypropylene, polyvinylidene fluoride, aramid, polyethylene terephthalate, polytetrafluoro ethylene, polyacrylonitrile, polyimide, polyamide, polyester, and natural fiber.

An embodiment of the present invention provides an electric device including the above-described secondary battery. The secondary battery serves as a power supply for the electric device.

The electrical device refers to any device that may use electrical energy and convert it into one or more of mechanical energy, thermal energy, light energy, etc., such as an electric motor, an electric heat engine, an electric light source, etc. Specifically, the mobile device may include, but is not limited to, a mobile device, an electric vehicle, an electric train, a ship and a satellite, an energy storage system, etc. The mobile device may be a mobile phone, a notebook computer, an unmanned aerial vehicle, a sweeping robot, an electronic cigarette, etc. The electric vehicle may be a pure electric vehicle, a hybrid electric vehicle, a plug-in hybrid electric vehicle, an electric bicycle, an electric scooter, an electric golf cart, an electric truck, or the like.

The invention is further illustrated by the following specific examples.

In particular embodiments of the present invention, the detection method for $W_{Al}$ and $W_S$ is as follows.

After disassembling the secondary battery and taking out the negative plate, the negative plate of 5 cm×5 cm is cut, and the materials except the negative current collector are scraped. 1.0000 g of sample is weighed, with the accuracy of up to 0.0001 g, and it is placed into a dry and clean Teflon beaker without impurities. A small amount of ultrapure water is added to wet the powder. 15 ml of aqua regia is added. The mixture is placed on a heating plate to heat at 230° C. for 25 min. Then the inner wall of the beaker is rinsed by ultrapure water, so that the sample adhered on the inner wall flows into the bottom of the beaker to continue heating for 20 min. Then, it is filtered with quantitative filter paper and diluted with the purified water to 50 mL. A blank sample is prepared by the same method. Finally, a test is made by an inductively coupled plasma emission spectrometer. The test instrument may be Perkin-Elmer Opitima 8000, in the unit of ppm.

In particular embodiments of the present invention, the contact angle α is measured as follows.

With ethylene carbonate and methyl ethyl carbonate (weight ratio is 1:1) as a solvent, a contact angle test is performed using a JC2000D2M contact angle tester manufactured by Shanghai Zhongchen Digital Technology Equipment Co. Ltd., and the specific test conditions are as follows. The negative plate was kept in an environment of 25° C. for 30 min, and then the solvent was dropped one by one at different positions on the surface of the anode active material layer of the negative plate (one drop at each position). The instant at which the drop completely contacted the anode active material layer was observed using a contact angle tester, and the contact angle at this time was calculated. The test results at different positions were averaged to obtain the contact angle of the anode active material layer.

In a specific embodiment of the present invention, the ion transport impedance (R) is detected by the following method.

A symmetrical battery was prepared by using two identical negative plates. The alternating current impedance of the symmetrical battery was measured by using an electrochemical workstation to collect an electrochemical impedance spectrum (EIS) of the symmetrical battery. The specific test conditions includes sine AC voltage excitation with amplitude of 5 mV and frequency range of 0.1 Hz to $10^6$ Hz. The Impedance composition was deeply analyzed by the equivalent circuit diagram and impedance decomposition model to obtain the Nyquist diagram and bode diagram. The Z-view or EC-Lab software was used for fitting, and the coincidence degree between the simulation diagram and the measured diagram was improved by adjusting the values of the impedances and then fitted by Z-view or EC-Lab software to obtain the ion transport impedance of ions in the plate.

In a specific example of the present invention, the weight ratio of the carbon material to the silicon oxide is determined by the following method.

The secondary battery was decomposed under a nitrogen atmosphere environment for separating and taking out the negative plate and then stripping the anode active material layer from the negative current collector. The anode active material layer was dissolved in N-methyl-2-pyrrolidone to collect the anode active material. Then, the weight of the carbon material contained in the anode active material was measured using a combustion method, denoted as ml. The proportion of silicon was determined by an ICP optical emission spectrum and a ICP mass spectrum. The binding state of silicon and oxygen (namely, the value of x in $SiO_x$) was checked by using an X-ray photoelectron spectroscopy (XPS), thereby specifying the composition and weight of the silicon oxide, denoted as m2. Thus, the weight proportion of silicon oxide relative to the total amount of the carbon material and the silicon oxide (m %)=m2/(m1+m2)×100%.

Example 1

This embodiment provides a lithium ion battery, and the specific preparation method is as follows.

(1) Preparation of Negative Plate (1.1) Preparation of Anode Active Material

A carbon source precursor (petroleum pitch powder) and a doping element precursor (ammonium persulfate and/or aluminium fluoride) was mixed, and the mixture reacted at 150° C. for 7 h to obtain a modified carbon source precursor;

The obtained modified carbon source precursor was graphitized under a nitrogen atmosphere at A1° C. for A2 h. The mixture was cooled down, and then crushed to obtain a carbon material containing a doping element.

Silicon, silicon dioxide and a doping element (elemental aluminium and/or elemental sulphur) was mixed. The silicon and silicon dioxide were in a ratio of 1:1. After the mixture was ball-milled by B1 rpm for B2 h, it was heated and gasified at B3° C. for B4 h under the condition of vacuumizing to a degree of vacuum of 10 Pa. The same was rapidly cooled in an environment of 25° C., and then classified and finely crushed by rough crushing and jet milling to obtain an intermediate product ($SiO_x$ containing a doping element). Then the same was put into a rotary converter. Acetylene was introduced into the rotary converter under a nitrogen atmosphere for vapour deposition, where the temperature of the vapour deposition was controlled at 800° C. to 850° C. to form a carbon layer coated on the surface of the intermediate product. The introduction rate of acetylene and the vapour deposition time was controlled so that the weight of the coated carbon layer accounted for about 3.5 wt. % of the weight of the product. Thereby, a silicon oxide material containing a doping element was prepared, where the inner core was $SiO_x$ containing a doping element, and the outer layer was coated with a carbon layer.

A carbon material containing a doping element and a silicon oxide material containing a doping element was mixed in a weight ratio of 95:5 to obtain an anode active material.

The specific settings of A1-A2 and B1-B4 are shown in Table 1.

The values of $W_{Al}$ and $W_S$ were adjusted by controlling the addition amount of a doping element precursor (ammonium persulfate, aluminium fluoride) and the addition amount of a doping element (elemental aluminium and/or elemental sulphur) to meet the requirements shown in Table 2.

(1.2) An anode active material, a conductive agent (CNT), a thickener (carboxymethyl cellulose, CMC) and a binder (styrene-butadiene rubber, SBR) were mixed in a mass ratio of 96:2:1:1. An anode slurry was prepared in a wet process by using a vacuum stirrer. The anode slurry was uniformly coated on both sides of a negative current collector (a copper foil). The negative current collector coated with the anode slurry was transferred into an oven for drying, and then rolled and cut to obtain a negative plate. The values of the ion transport impedance R and the contact angle α were adjusted by controlling the specific parameters of A1 to A2 and B1 to B4 and the conditions of coating and rolling so as to satisfy the values shown in Table 2.

(2) Preparation of Positive Plate

A cathode active material $Li(Ni_{0.7}Mn_{0.2}Co_{0.1})O_2$, a binder (polyvinylidene fluoride) and a conductive agent (carbon black) were mixed in a mass ratio of 95:2.5:2.5. The mixture was added with N-methylpyrrolidone (NMP), and the same was stirred under the action of a vacuum stirrer until the mixed system formed a cathode slurry with uniform fluidity. The cathode slurry was uniformly coated on both sides of the positive current collector (aluminium foil). The positive current collector coated with the cathode slurry was transferred to an oven for drying, and then subjected to rolling and cutting to obtain a positive plate.

(3) Preparation of Electrolyte

Ethylene carbonate (EC) and ethyl methyl carbonate (EMC) were mixed in a weight ratio of 1:1 to obtain an organic solvent, and then sufficiently dried lithium salt $LiPF_6$ was dissolved in the mixed organic solvent to prepare an electrolyte with a concentration of 1 mol/L.

(4) Preparation of Separator

A polyethylene (PE) separator coated with ceramic and polyvinylidene fluoride was used.

(5) Preparation of Battery

The prepared positive plate, separator and negative plate were wound to obtain a bare electric core without liquid injection. The bare electric core was placed in an outer packaging foil. The above-mentioned prepared electrolyte was injected into the dried bare electric core. The same was subjected to vacuum packaging, standing, formation, shaping, sorting and other processes to obtain a lithium ion battery.

Examples 2-13, and Comparative Examples 1-3

Examples 2-13 and Comparative Examples 1-3 respectively provide a lithium ion battery, the preparation method of which is similar to that of Example 1, except that:

The values of $W_{Al}$ and $W_S$ in Examples 2 to 13 and Comparative Examples 1 to 3 were adjusted by controlling the addition amount of the doping element precursor (ammonium persulfate, aluminum fluoride) and the addition amount of the doping element (elemental aluminum and/or elemental sulfur) so as to meet the requirements shown in Table 2. The values of the ion transport impedance R and the contact angle α were adjusted by controlling the specific parameters of A1 to A2 and B1 to B4 and the conditions of coating and rolling, so as to meet the requirements shown in Table 2. The specific settings of A1-A2 and B1-B4 are shown in Table 1.

Examples 14-15

Examples 14 and 15 respectively provide a lithium ion battery, the preparation method of which is similar to that of Example 1, except that:

In Example 14, the preparation of negative plate is as follows:

The petroleum asphalt powder was subjected to a low-temperature pre-carbonization treatment at 700° C. for 5 h and then a high-temperature carbonization treatment at 1590° C. for 3 h under a nitrogen atmosphere. After cooling down, a carbon material was obtained by crushing the same.

The same was screened to obtain a silicon oxide containing 12 ppm of an aluminium element and 31 ppm of a sulphur element, and classified and finely crushed by rough crushing and jet milling to obtain an intermediate product (a silicon oxide containing a doping element). Then the same was put into a rotary converter. Acetylene was introduced into the rotary converter under a nitrogen atmosphere for vapour deposition, where the temperature of the vapour deposition was controlled at 800° C. to 850° C. to form a carbon layer coated on the surface of the intermediate product. The introduction rate of acetylene and the vapour deposition time was controlled so that the weight of the coated carbon layer accounted for about 3.5 wt. % of the weight of the product. Thereby, a silicon oxide material containing a doping element was prepared, where the inner core was $SiO_x$ containing a doping element, and the outer layer was coated with a carbon layer.

A carbon material and a silicon oxide material containing a doping element was mixed in a weight ratio of 95:5 to obtain an anode active material.

The value of the wetting angle α was adjusted by the conditions of coating and rolling to satisfy Table 2.

Example 15 Preparation of Negative Plate

The petroleum asphalt powder was subjected to a low-temperature pre-carbonization treatment at 730° C. for 5 h and then a high-temperature carbonization treatment at 1150° C. for 4 h under a nitrogen atmosphere. After cooling down, a carbon material was obtained by crushing the same.

The same was screened to obtain a silicon oxide containing 240 ppm of an aluminium element and 260 ppm of a sulphur element, and classified and finely crushed by rough crushing and jet milling to obtain an intermediate product (a silicon oxide containing a doping element). Then the same was put into a rotary converter. Acetylene was introduced into the rotary converter under a nitrogen atmosphere for vapour deposition, where the temperature of the vapour deposition was controlled at 800° C. to 850° C. to form a carbon layer coated on the surface of the intermediate product. The introduction rate of acetylene and the vapour deposition time was controlled so that the weight of the coated carbon layer accounted for about 3.5 wt. % of the weight of the product. Thereby, a silicon oxide material containing a doping element was prepared, where the inner core was $SiO_x$ containing a doping element, and the outer layer was coated with a carbon layer.

A carbon material and a silicon oxide material containing a doping element was mixed in a weight ratio of 95:5 to obtain an anode active material.

The value of the wetting angle α was adjusted by the conditions of coating and rolling to satisfy Table 2.

Examples 16-17

Examples 16 and 17 respectively provide a lithium ion battery, the preparation method of which is similar to that of Example 1, except that:

In the step of preparing the negative plate in Examples 16-17, the values of $W_{Al}$ and $W_S$ were adjusted by controlling the addition amount of the doping element precursor (ammonium persulfate, aluminum fluoride) and the addition amount of the doping element (elemental aluminum and/or elemental sulfur) so as to meet the requirements shown in Table 2. The values of the ion transport impedance R and the contact angle α were adjusted by controlling the specific parameters of A1 to A2 and B1 to B4 and the conditions of coating and rolling, so as to meet the requirements shown in Table 2. The specific settings of A1-A2 and B1-B4 are shown in Table 1.

In addition, in the step of preparing the negative plate, the carbon material and the silicon oxide material containing a doping element were mixed in a weight ratio of 99:1 to obtain an anode active material.

In the step of preparing a negative plate in Example 17, a carbon material and a silicon oxide material containing a doping element were mixed in a weight ratio of 90:10 to obtain an anode active material.

TABLE 1

| | A1 (° C.) | A2 (h) | B1 (rpm) | B2 (h) | B3 (° C.) | B4 (h) |
|---|---|---|---|---|---|---|
| Example 1 | 2900 | 7.5 | 550 | 3 | 1000 | 5 |
| Example 2 | 2855 | 8 | 550 | 2.5 | 1050 | 5.5 |
| Example 3 | 2800 | 8 | 650 | 3.5 | 1100 | 3 |
| Example 4 | 3000 | 7 | 750 | 5 | 900 | 4.5 |
| Example 5 | 2600 | 5 | 650 | 4.5 | 900 | 6 |
| Example 6 | 2750 | 5 | 700 | 5 | 850 | 4 |
| Example 7 | 2880 | 3 | 650 | 4 | 1000 | 5.5 |
| Example 8 | 2350 | 3.5 | 700 | 8.5 | 1050 | 2 |
| Example 9 | 2650 | 4.5 | 500 | 3 | 1200 | 1.5 |
| Example 10 | 2500 | 3 | 750 | 3.5 | 700 | 5.5 |
| Example 11 | 2700 | 4 | 450 | 7 | 750 | 6 |
| Example 12 | 3000 | 6.5 | 600 | 3.5 | 1200 | 3.5 |
| Example 13 | 2900 | 4.5 | 800 | 2.5 | 1150 | 5 |
| Example 16 | 2850 | 4.5 | 650 | 10 | 950 | 5.5 |
| Example 17 | 2950 | 4 | 750 | 5.5 | 900 | 4 |
| Comparative Example 1 | 2230 | 7.5 | 700 | 3 | 800 | 1.5 |
| Comparative Example 2 | 2980 | 5 | 600 | 2 | 1200 | 2.5 |
| Comparative Example 3 | 2310 | 6.5 | 750 | 5 | 750 | 3.5 |

TABLE 2

| | $W_{Al}$ (ppm) | $W_S$ (ppm) | α (°) | R (Ω) | $\lg(W_{Al} \times W_S/\alpha)$ | $\lg(W_S \times R) + 0.15 \times R$ |
|---|---|---|---|---|---|---|
| Example 1 | 10.6 | 17.8 | 22.6 | 1.52 | 0.922 | 1.30 |
| Example 2 | 8 | 21.5 | 28.9 | 1.86 | 0.775 | 1.34 |
| Example 3 | 5.6 | 16.6 | 25.4 | 1.17 | 0.563 | 1.33 |
| Example 4 | 5.0 | 18.5 | 35.2 | 0.22 | 0.420 | 1.96 |
| Example 5 | 4.1 | 18.5 | 22.5 | 1.48 | 0.528 | 1.32 |
| Example 6 | 10.5 | 3.8 | 22.9 | 0.06 | 0.241 | 1.81 |
| Example 7 | 9.7 | 18.9 | 25.8 | 2.59 | 0.852 | 1.25 |
| Example 8 | 5.6 | 13.7 | 41.6 | 0.15 | 0.266 | 1.98 |
| Example 9 | 5.1 | 4.5 | 22.1 | 1.80 | 0.016 | 0.67 |
| Example 10 | 8.9 | 5.9 | 32.9 | 0.85 | 0.203 | 0.97 |
| Example 11 | 10.1 | 21 | 22.3 | 0.61 | 0.978 | 1.63 |
| Example 12 | 1.6 | 8.6 | 46.5 | 0.49 | −0.529 | 1.32 |
| Example 13 | 11.3 | 19.8 | 20.2 | 0.08 | 1.044 | 2.41 |
| Example 14 | 0.5 | 1.5 | 40.1 | 1.65 | −1.728 | 0.21 |
| Example 15 | 11.9 | 12.8 | 38.0 | 2.82 | 0.603 | 1.08 |

TABLE 2-continued

| | $W_{Al}$ (ppm) | $W_S$ (ppm) | α (°) | R (Ω) | $lg(W_{Al} \times W_S/\alpha)$ | $lg(W_S \times R) + 0.15 \times R$ |
|---|---|---|---|---|---|---|
| Example 16 | 7.5 | 18.2 | 28.9 | 0.28 | 0.674 | 1.85 |
| Example 17 | 6.1 | 15.9 | 33.4 | 1.39 | 0.463 | 1.27 |
| Comparative Example 1 | 11.8 | 21.4 | 20.3 | 1.59 | 1.095 | 1.37 |
| Comparative Example 2 | 0.7 | 1.1 | 48.9 | 2.21 | −1.803 | 0.03 |
| Comparative Example 3 | 2.9 | 1.5 | 43.2 | 2.93 | −0.997 | 0.15 |

The lithium ion batteries prepared in Examples and Comparative Examples were subjected to performance tests according to the following methods.

(1) Low Temperature Volume Retention: at 25° C., the lithium ion battery was discharged to 2.5V at a constant current of 1/3 C, and the capacity was recorded to $A_0$. At −10° C., the same battery was discharged to 2.0V at a constant current of 1/3 C, and the capacity was recorded as A1. The capacity retention (A %) was calculated as follows: A %=$A_1/A_0 \times 100\%$.

(2) Cycle Life: the charge/discharge cycle test was performed on the lithium ion battery at 25° C. by using a battery charge/discharge tester. The charge/discharge system: the battery was charged to 4.25V at a constant current of 3 C, then charged at a constant voltage until the current droped to 0.02 C. After standing for 5 min, the battery was discharged to 2.5V at a constant current of 1 C. The above was one cycle. As the battery cycled, the battery capacity decayed, and the number of cycles experienced when the capacity decayed to 80% of the first discharge capacity was recorded as the fast charge cycle life of the battery.

(3) Microcrack condition: after the lithium ion battery cycled at 45° C. for 200 cycles, it was subjected to no charge and disassembly. The negative plate soaked in DMC for 12 h, then cleaned and dried. The central area of negative plate was cut out with the length-width dimension of 5×5 cm as the sample. The microcrack of the sample was observed under the scanning electron microscope at the magnification of 500×. The evaluation criteria are as follows. The sample was divided into 25 regions of the same size in the unit of 1×1 cm, and whether microcracks appeared in each region was observed. The provided figure is a partial scanning electron micrograph of Comparative Example 1, and the microcracks are shown as red circles in the figure. When the microcracks were present in 0-2 regions of the sample, the microcrack condition was in Level 1. When the microcracks were present in 3-5 regions of the sample, the microcrack condition was in Level 2. When the microcracks were present in 6-15 regions of the sample, the microcrack condition was in Level 3. When the microcracks were present in 16 or more regions of the sample, the microcrack condition was in Level 4.

The test results are seen in Table 3.

TABLE 3

| | Retention rate of low-temperature capacity | Cycle life | Microcrack condition |
|---|---|---|---|
| Example 1 | 87.8% | 3250 | Level 1 |
| Example 2 | 88.3% | 3300 | Level 1 |
| Example 3 | 88.1% | 3280 | Level 1 |
| Example 4 | 87.2% | 3200 | Level 1 |
| Example 5 | 85.2% | 3100 | Level 1 |
| Example 6 | 85.8% | 3050 | Level 2 |
| Example 7 | 85.2% | 3020 | Level 1 |
| Example 8 | 86.0% | 3080 | Level 1 |
| Example 9 | 83.5% | 2870 | Level 2 |

TABLE 3-continued

| | Retention rate of low-temperature capacity | Cycle life | Microcrack condition |
|---|---|---|---|
| Example 10 | 83.1% | 2820 | Level 2 |
| Example 11 | 83.9% | 2910 | Level 1 |
| Example 12 | 82.4% | 2750 | Level 2 |
| Example 13 | 82.8% | 2710 | Level 2 |
| Example 14 | 82.2% | 2720 | Level 2 |
| Example 15 | 82.3% | 2760 | Level 2 |
| Example 16 | 87.5% | 3260 | Level 1 |
| Example 17 | 88.4% | 3210 | Level 2 |
| Comparative Example 1 | 78.9% | 2370 | Level 3 |
| Comparative Example 2 | 73.5% | 2130 | Level 4 |
| Comparative Example 3 | 75.1% | 2020 | Level 4 |

As can be seen from the test results in Table 3, the lithium ion batteries prepared in each example had a capacity retention rate of ≥82% at a low temperature, a cycle life of ≥2700, and a microcrack condition of Level 1 or 2, indicating that the microcrack condition generated after high-temperature cycling was minimal.

According to the comparison between Examples 9-11 and Examples 1-4, it can be seen that when the negative plate further satisfies Formula (3) and/or Formula (4) on the basis of satisfying Formulas (1) and (2), the capacity retention rate and cycle life of the lithium ion battery at a low temperature are relatively higher, and the microcrack condition is in Level 1.

According to the comparison between Examples 5-8 and Examples 1-4, it can be seen that, in the case where the negative plates all satisfy Formulas (3) and (4), when $W_{Al}$ is 5 ppm to 10.6 ppm, $W_S$ is 4.5 ppm to 21.5 ppm, α is 22° to 35° and R is 0.2Ω to 2Ω, the cycle performance, the capacity retention rate and the crack condition of the fabricated battery are relatively better.

The relationship of $W_{Al}$, $W_S$, α, and R of the negative plate prepared in the comparative example does not satisfy Formula (1) and/or Formula (2) described in the present invention. The lithium ion battery using the negative plate has poor capacity retention and cycle life, has a capacity retention of only 79% or less at low temperature, and a cycle life of only 2020-2370. Also, more microcracks appear on the surface of the negative plate after high temperature cycling.

Finally, it should be noted that the above examples are merely illustrative of the technical solutions of the present invention and do not limit the scope of the present invention. Although the present invention has been described in detail with reference to preferred examples, those skilled in the art will understand that the technical solutions of the present invention shall be modified or equivalently replaced without departing from the spirit and scope of the invention.

What is claimed is:

1. A negative plate comprising a negative current collector and an anode active material layer provided on at least one surface of the negative current collector, the anode active material layer comprising an anode active material, wherein the anode active material comprises a carbon material and a silicon oxide; the anode active material further comprises an aluminum element and a sulfur element; wherein the negative plate satisfies the relationships described in Formula (1) and Formula (2):

$$-1.75 \leq lg(W_{A1} \times W_S/\alpha) \leq 1.05, \quad \text{Formula (1)},$$

$$0.2 \leq lg(W_S \times R) + 0.15 \times R \leq 2.5, \quad \text{Formula (2)};$$

$W_{Al}$ and $W_S$ are mass fractions of aluminum and sulfur in the anode active material respectively, in the unit of ppm;

α is a contact angle, in degrees (°), of the anode active material layer with a solvent, where the solvent is a mixed solution of ethylene carbonate and methyl ethyl carbonate in a weight ratio of 1:1;

R is an ion transport impedance of the negative plate, in the unit of ohms (Ω).

2. The negative plate according to claim 1, wherein the negative plate satisfies the relationship described by Formula (3):

$$0.2 \leq lg(W_{A1} \times W_S/\alpha) \leq 0.95, \quad \text{Formula (3)}.$$

3. The negative plate according to claim 2, wherein the negative plate satisfies the relationship described by Formula (4):

$$1.25 \leq lg(W_S \times R) + 0.15 \times R \leq 2.0, \quad \text{Formula (4)}.$$

4. The negative plate according to claim 1, wherein the $W_{Al}$ ranges from 0.5 ppm to 12 ppm; and/or the $W_S$ ranges from 1.0 ppm to 22 ppm.

5. The negative plate according to claim 4, wherein the $W_{Al}$ ranges from 5.0 ppm to 10.6 ppm; and/or the $W_S$ ranges from 4.5 ppm to 21.5 ppm.

6. The negative plate according to claim 1, wherein the α ranges from 20° to 50°.

7. The negative plate according to claim 6, wherein the α ranges from 22° to 35°.

8. The negative plate according to claim 1, wherein the R ranges from 0.05Ω to 3Ω.

9. The negative plate according to claim 8, wherein the R ranges from 0.2Ω to 2Ω.

10. The negative plate according to claim 1, wherein the silicon oxide is present in a weight ratio of 1 wt. % to 10 wt. % based on a total weight of the carbon material and the silicon oxide.

11. A secondary battery comprising a positive plate, a negative plate and an electrolyte, wherein the negative plate is the negative plate according to claim 1.

12. An electric device, comprising the secondary battery according to claim 11.

* * * * *